United States Patent
Cho

(10) Patent No.: US 12,545,224 B2
(45) Date of Patent: Feb. 10, 2026

(54) RESERVOIR TANK FOR BRAKE SYSTEM

(71) Applicant: HL MANDO CORPORATION, Gyeonggi-do (KR)

(72) Inventor: Jooun Cho, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/144,097

(22) Filed: May 5, 2023

(65) Prior Publication Data

US 2023/0356702 A1    Nov. 9, 2023

(30) Foreign Application Priority Data

May 6, 2022   (KR) .......................... 10-2022-0055960

(51) Int. Cl.
*B60T 11/22*    (2006.01)

(52) U.S. Cl.
CPC ..................... *B60T 11/22* (2013.01)

(58) Field of Classification Search
CPC ....................................... B60T 11/22
See application file for complete search history.

(56) References Cited

FOREIGN PATENT DOCUMENTS

| DE | 112014004992 T5 | * | 7/2016 | ............. B60T 11/22 |
|----|-----------------|---|--------|------------------------|
| JP | 2000-255410 | | 9/2000 | |
| JP | 2012-228989 | | 11/2012 | |
| JP | 2018-118659 | | 8/2018 | |
| KR | 10-0731689 | | 6/2007 | |
| KR | 20130026635 A | * | 9/2011 | ............. B65D 41/02 |
| KR | 10-2015-0075853 | | 7/2015 | |
| KR | 20210128677 A | * | 10/2021 | ............. B60T 11/22 |
| WO | WO-2014122955 A1 | * | 8/2014 | ............. B01D 29/01 |
| WO | WO-2019076642 A1 | * | 4/2019 | |

OTHER PUBLICATIONS

Machine Translations of the foreign documents are merged with the attached foreign document.*
Machine Translation of KR-20210128677 attached.*
Office Action dated Oct. 18, 2023 for Korean Patent Application 10-2022-0055960 and its English translation from Global Dossier.

* cited by examiner

*Primary Examiner* — Nathaniel E Wiehe
*Assistant Examiner* — Daniel S Collins
(74) *Attorney, Agent, or Firm* — WOMBLE BOND DICKINSON (US) LLP

(57) ABSTRACT

In accordance with one aspect of the present disclosure, a reservoir tank for a brake system can be provided, and the reservoir tank includes an upper body provided with an oil injector through which oil is injected, a lower body provided with a port through which oil is supplied to a master cylinder and coupled to the upper body to form an oil space, and a partition provided in the oil space to prevent the oil from being gathered at one side, wherein the partition includes a plurality of first partitions formed vertically and a second partition provided between the plurality of first partitions and provided with a communication space formed therein to communicate with the port.

15 Claims, 4 Drawing Sheets

RESERVOIR TANK FOR BRAKE SYSTEM

CROSS-REFERENCE TO RELATED APPLICATION

This application claims the benefit of Korean Patent Application No. 10-2022-0055960, filed on May 6, 2022 in the Korean Intellectual Property Office, the disclosure of which is incorporated herein by reference.

BACKGROUND

1. Field

Embodiments of the present disclosure relate a reservoir tank for a brake system, and more specifically, to a reservoir tank for a brake system capable of storing brake oil supplied to a master cylinder.

2. Description of the Related Art

In general, in a reservoir tank for a brake system, a space capable of storing brake oil may be formed. In addition, the reservoir tank may be connected to a master cylinder which generates a hydraulic brake pressure according to a depression force of a brake pedal, and the oil stored in the reservoir tank may be supplied to the master cylinder.

Typically, the reservoir tank may include an oil injector for injecting oil and a port for discharging oil in the reservoir tank to the master cylinder. In addition, a plurality of partitions may be vertically formed in the reservoir tank.

The reservoir tank may include a float which floats in the reservoir tank and detects an amount of residual oil, and vertical movement of the float may be guided by a float guide in the reservoir tank.

SUMMARY

Therefore, it is an aspect of the present disclosure to provide a reservoir tank for a brake system in which a second partition is provided to prevent air from entering the reservoir tank through a port.

It is an aspect of the present disclosure to provide a reservoir tank for a brake system capable of preventing air from entering an oil space through a port to reduce noise generation.

It is an aspect of the present disclosure to provide a reservoir tank for a brake system capable of preventing air from entering an oil space through a port to prevent degradation of pedal feeling and brake performance.

It is an aspect of the present disclosure to provide a reservoir tank for a brake system in which a fluid in an oil space flows smoothly through a second partition provided with an opening.

In accordance with one aspect of the present disclosure, a reservoir tank for a brake system includes an upper body provided with an oil injector through which oil is injected, a lower body provided with a port through which oil is supplied to a master cylinder and coupled to the upper body to form an oil space, and a partition provided in the oil space to prevent the oil from being gathered at one side, wherein the partition includes a plurality of first partitions formed vertically and a second partition provided between the plurality of first partitions and provided with a communication space formed therein to communicate with the port.

An opening may be formed in a wall surface of the second partition.

The opening may be formed in the wall surface at a side opposite to a side at which the second partition faces the oil injection portion.

The opening may be formed to extend vertically.

The second partition may be formed on the upper body to be inclined at a predetermined angle with respect to the port.

The partition may be integrally formed with at least one of the upper body and the lower body.

The reservoir tank for a brake system may further include a float configured to vertically move along an oil level in the oil space to measure an amount of residual oil in the oil space and a float guide configured to guide the vertical movement of the float.

The reservoir tank for a brake system may further includes an oil detector provided on a lower end portion of the float.

The second partition may be provided in a hollow cylindrical shape.

The port and the second partition may be provided as a plurality of ports and a plurality of second partitions.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
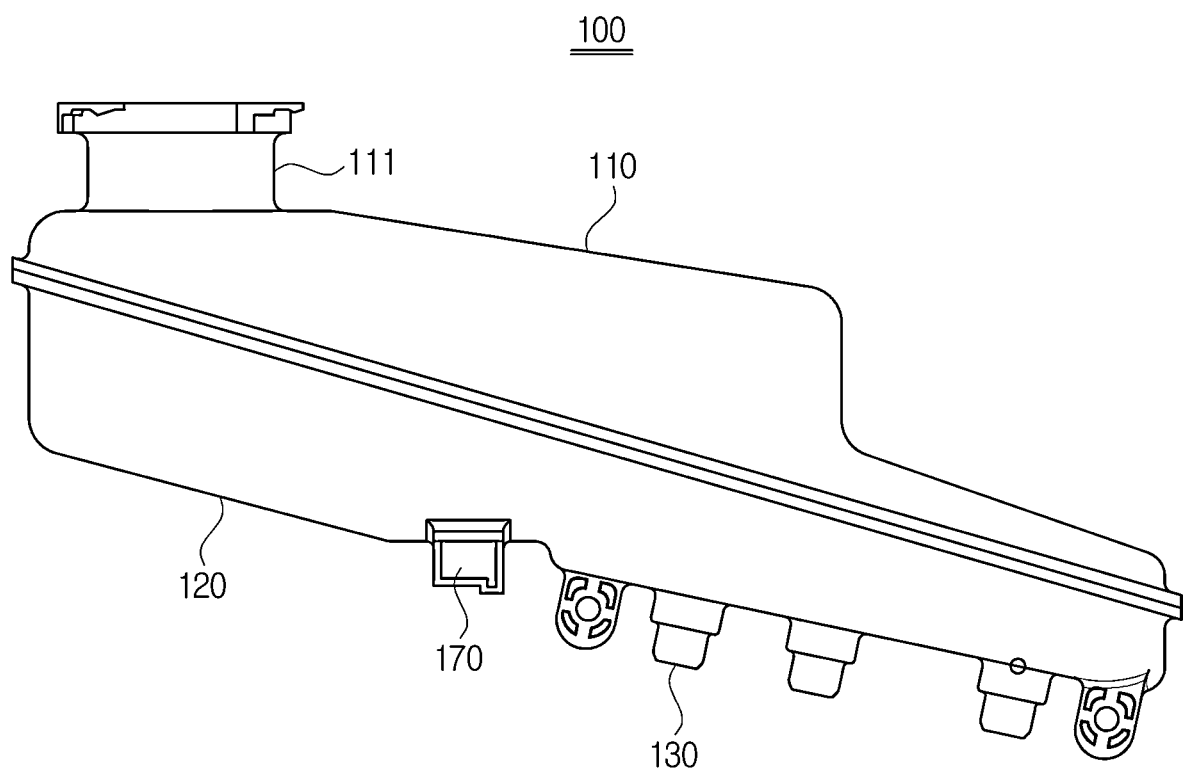
FIG. 1 is a front view illustrating a reservoir tank for a brake system according to one embodiment of the present disclosure.

Hereinafter, embodiments of the present disclosure will be described in detail with reference to the accompanying drawings. The following embodiments are provided to sufficiently convey the spirit of the present disclosure to those skilled in the art. The present disclosure is not limited to the embodiments disclosed herein and may be implemented in different forms. In the drawings, portions which are not related to the description may be omitted for clarifying the present disclosure, and sizes of components may be exaggerated for facilitating understanding of the present disclosure.

Figure 2:
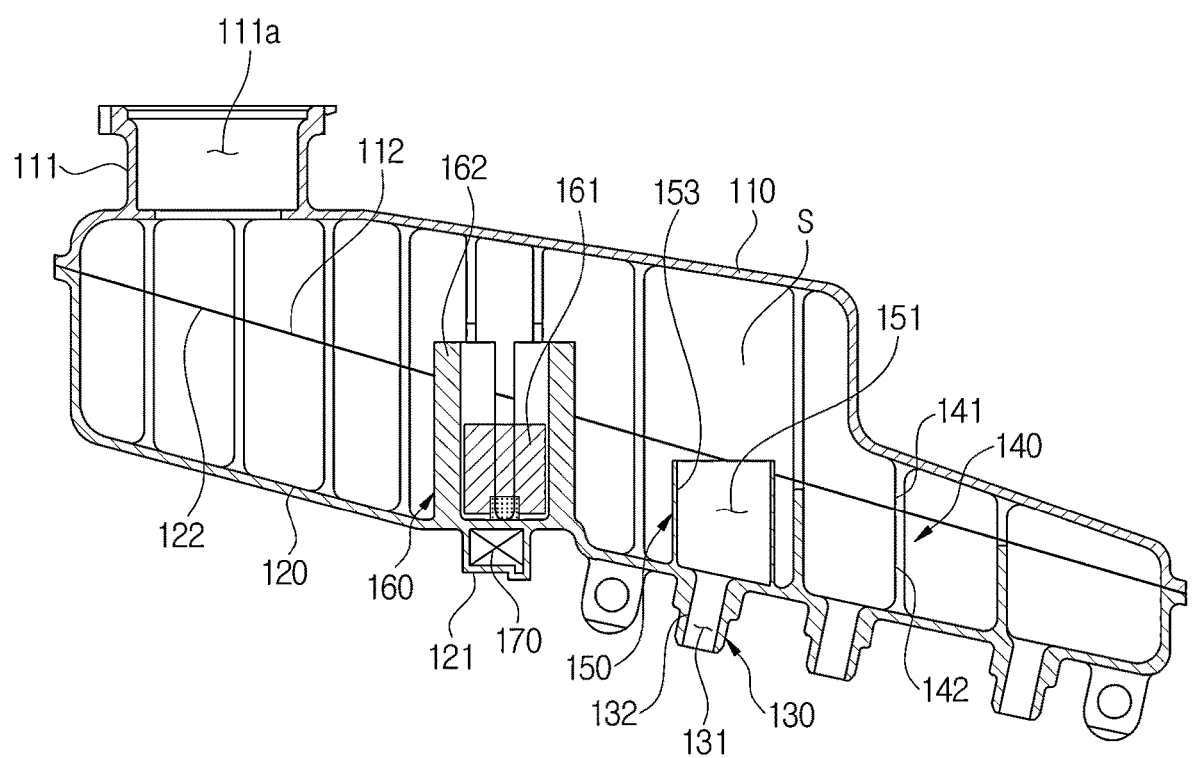
FIG. 2 is a cross-sectional view illustrating the reservoir tank for a brake system according to one embodiment of the present disclosure.
Figure 3:
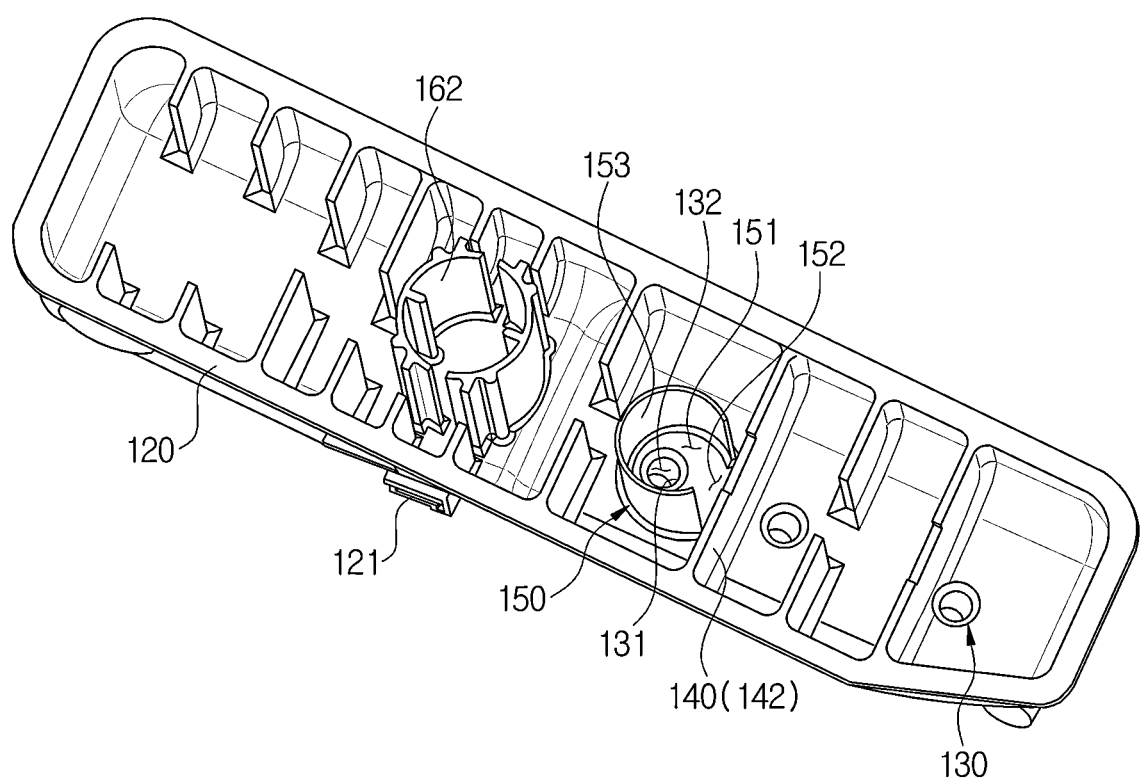
FIG. 3 is a cutaway perspective view illustrating the reservoir tank for a brake system according to one embodiment of the present disclosure.
Figure 4:
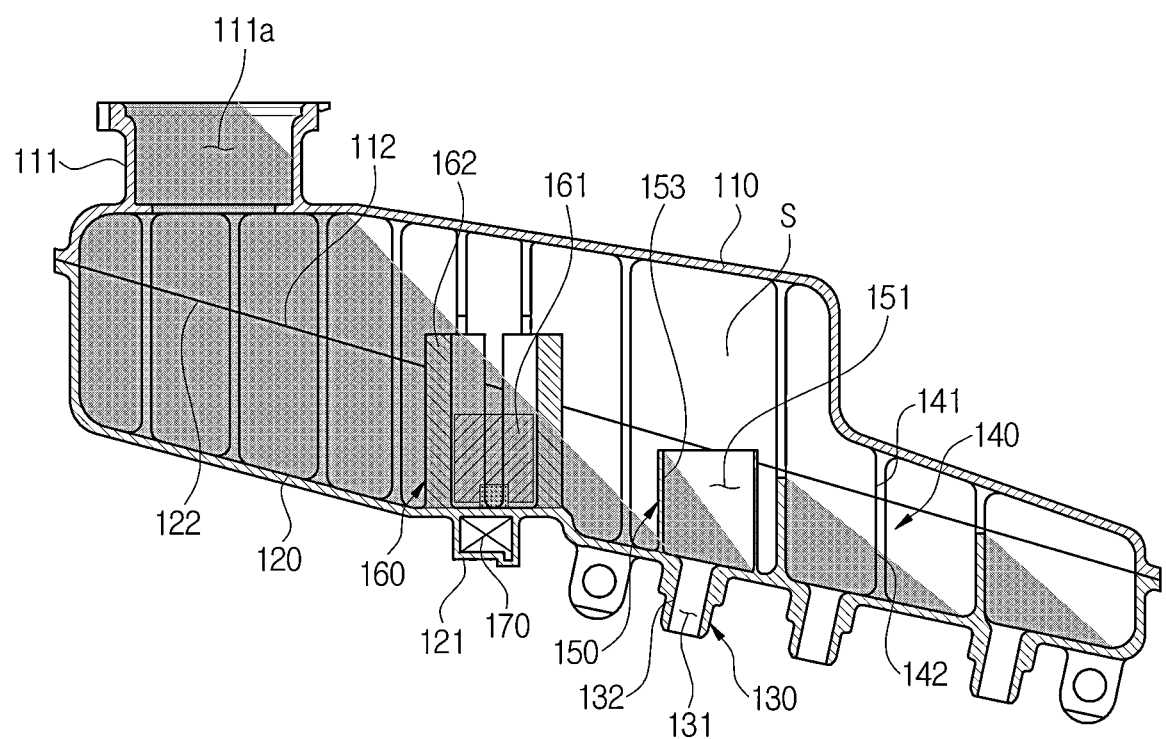
FIG. 4 is a cross-sectional view illustrating a state in which oil is accommodated in an oil space of the reservoir tank for a brake system according to one embodiment of the present disclosure.

FIG. 1 is a front view illustrating a reservoir tank for a brake system according to one embodiment of the present disclosure, and FIG. 2 is a cross-sectional view illustrating the reservoir tank for a brake system according to one embodiment of the present disclosure. FIG. 3 is a cutaway perspective view illustrating the reservoir tank for a brake system according to one embodiment of the present disclosure, and FIG. 4 is a cross-sectional view illustrating a state in which oil is accommodated in an oil space of the reservoir tank for a brake system according to one embodiment of the present disclosure.

Referring to FIGS. 1 to 4, a reservoir tank 100 of the present disclosure may be coupled to a master cylinder which generates a hydraulic brake pressure. The master cylinder may generate the hydraulic pressure when a piston provided in the master cylinder moves forward according to a depression force of a brake pedal, and the generated hydraulic brake pressure may be provided to a wheel cylinder for braking.

In the reservoir tank 100 of the present disclosure, an oil space S for storing oil supplied to the master cylinder may be formed. The oil space S is a space formed between an upper body 110 and a lower body 120 of the reservoir tank 100 when the upper body 110 and the lower body 120 are coupled through a heat-fusing. The oil space S may store the oil to be supplied to the master cylinder.

An oil injector 111 for injecting the oil may be formed in one side of the upper body 110. The oil injector 111 may be provided in a cylindrical shape as illustrated in the drawings but is not limited thereto. An interior of the oil injector 111 may be open to form a passage 111a along which the oil is supplied.

Meanwhile, although not illustrated in the drawings, a detachable reservoir cap may be mounted onto the oil injector 111. When the reservoir cap is mounted onto the oil injector 111, the oil injector 111 may be closed to prevent air, foreign matter, and the like from entering the reservoir tank 100. In addition, when the reservoir cap is separated from the oil injector 111, oil may be supplied into the reservoir tank 100.

In addition, an upper filter may be provided in a lower portion of the oil injector 111. The upper filter may be connected to the lower portion of the oil injector 111 and may filter the oil injected through the oil injector 111. That is, the upper filter may remove foreign matter in the oil introduced into the reservoir tank 100. The upper filter may be integrally formed with the upper body 110. As described above, when the upper body 110 is formed, the upper filter provided in the upper body 110 is integrally formed with the upper body 110, and thus work efficiency can be improved when the upper body 110 is manufactured, and a time and a cost required for the filter that is separately formed and assembled later can be reduced.

At least one port 130 may be formed in the lower body 120. The port 130 formed in the lower portion of the reservoir tank 100 may be fitted to or inserted into the master cylinder and coupled to the master cylinder. Meanwhile, a flow path 131 connecting the oil space S of the reservoir tank 100 and the master cylinder may be formed between an inner wall surface 132 of the port 130.

A float part 160 may be provided in the lower body 120. The float part 160 may include a float 161 which vertically moves along an oil level in the oil space S to measure an amount of residual oil in the oil space S and a float guide 162 which guides the vertical movement of the float 161. In addition, the lower body 120 may include an oil detector 170 provided under the float 161.

The float guide 162 may be vertically provided in the reservoir tank 100, the float 161 may be provided inside the float guide 162 and vertically moved according to an amount of oil, and the oil detector 170 may be accommodated in an accommodation portion 121 formed in the lower body 120. An oil sensor in the oil detector 170 may be accommodated in the accommodation portion 121 to detect whether an oil liquid level between the float 161 and the oil detector 170 is a predetermined level or less.

When the amount of oil in the reservoir tank 100 is large, the float 161 floats at an upper level of the oil, moves upward, and moves away from the oil detector 170 because a density of the float 161 is smaller than that of the oil. When the amount of oil decreases, the level is lowered, and the float 161 also moves downward and approaches the oil detector 170. In this case, when the oil liquid level in the reservoir tank 10 is lowered, the amount of oil between the float 161 and the oil detector 170 decreases, and a distance between the float 161 and the oil detector 170 becomes a predetermined distance or less, a detection sensor may detect the distance and warn a driver by turning on a warning light on a display in a vehicle or the like. For example, when a defect of the reservoir tank 100 occurs, oil leaks into or out of a brake system of the vehicle, the amount of oil between the float 161 and the oil detector 170 decreases due to a decrease in oil liquid level in the reservoir tank 100, and the distance between the float 161 and the oil detector 170 becomes the predetermined distance or less, the detection sensor may detect the distance and warn the driver by turning on the warning light on the display. Accordingly, an accident can be prevented, and additional functions such as a replacement alarm for the reservoir tank 100 can also be implemented.

When the upper body 110 and the lower body 120 are coupled, the upper body 110 and the lower body 120 have heat-fusing surfaces 112 and 122 which are heat-fused, respectively. The heat-fusing surfaces 112 and 122 of the upper body 110 and the lower body 120 are melted and fused to each other, and when the heat-fusing surfaces 112 and 122 are cured, the upper body 110 and the lower body 120 may be coupled.

A partition which prevents oil from being gathered at one side may be provided in the oil space S. The partition may be integrally formed with at least one of the upper body 110 and the lower body 120. The partition may include a plurality of first partitions 140 and a second partition 150. A phenomenon, in which an amount of oil between the float 161 and the oil detector 170 is reduced and a distance between the float 161 and the oil detector 170 becomes a predetermined distance or less due an oil being gathered at one side in the oil space S even when a decrease in oil liquid level in the reservoir tank 100 does not occur, can be prevented by the partition.

Specifically, a problem that oil is gathered in a certain portion in the reservoir tank 10 due to an inertial force in an acceleration, deceleration, or left-right rolling condition, an amount of oil between the float 161 and the oil detector 170 is reduced, and a distance between the float 161 and the oil detector 170 decrease to a predetermined distance or less even though an oil liquid level in the reservoir tank 100 is not reduced may occur. Accordingly, the number of signals unnecessarily transmitted to a control system by the detection sensor increases, and the warning light on the display may be unnecessarily turned on. The partition is formed in the oil space S to prevent oil from excessively gathering in a certain portion due to an inertial force so as to prevent a distance between the float 161 and the oil detector 170 from decreasing to a predetermined distance or less even though an oil liquid level is not lowered. Accordingly, the number of signals unnecessarily transmitted from the detection sensor to the control system can decrease, and the warning light on the display can be prevented from being unnecessarily turned on. In this case, the warning light may be disposed at a position at which a driver inside or outside the vehicle can recognize the warning light without being limited to the display.

The first partitions 140 may be formed vertically. A plurality of protrusions and recesses may be formed at end portions of the first partitions 140. The plurality of protrusions and recesses may be formed at the end portions of the first partitions 140 to facilitate a flow of oil in the oil space S or to control a flow of oil so that the oil is accommodated in the flow path 131 of the port 130 to prevent air from entering the oil space S.

The first partitions 140 may include first upper partitions 141 formed in the upper body 110 and first lower partitions 142 formed in the lower body 120. The first upper partitions 141 may be integrally formed with the upper body 110, and the first lower partitions 142 may be integrally formed with the lower body 120.

The second partition 150 may be provided between the plurality of first partitions 140. The second partition 150 may be formed vertically, and a communication space 151 communicating with the port 130 may be formed in the second partition 150. The communication space 151 may communicate with the flow path 131 of the port 130 to allow oil to flow into and out of the reservoir tank 100. The second partition 150 may be provided in a hollow cylindrical shape as illustrated in the drawings. However, the second partition 150 is not limited thereto and may be provided as any type of hollow polygonal column.

In the second partition 150, an opening 152 may be formed in the wall surface 132. The opening 152 may be formed in the wall surface 132 of the second partition 150 to facilitate a flow of oil in the communication space 151 communicating with the flow path 131 and the oil space S. The opening 152 is formed to vertically extend to further facilitate the flow of oil in the communication space 151 and the oil space S.

In the second partition 150, the opening 152 may be formed in the wall surface 132 at a side opposite to a side at which the second partition 150 faces the oil injector 111. Since the opening 152 is formed in the wall surface 132 at the side opposite to the side at which the second partition 150 faces the oil injector 111, when the reservoir tank 100 is tilted forward (to the left based on FIG. 4) or rearward (to the right based on FIG. 4), oil accommodated in the communication space 151 in the second partition 150 may always flow to pass through the opening 152 of the second partition 150 without interruption, and thus the oil in the communication space 151 and the oil space S can flow more smoothly.

The second partition 150 may be formed on the upper body 110 to be inclined at a predetermined angle with respect to the port 130. Referring to FIG. 4, since the second partition 150 is formed on the upper body 110 to be inclined at the predetermined angle with respect to the port 130, even when the reservoir tank 100 is tilted forward (to the left based on FIG. 4), the oil is accommodated in the communication space 151 in the second partition 150 and the flow path 131 in the port, and thus air can be prevented from entering the oil space S through the port 130. The present disclosure is not limited thereto, and an inclination and a direction between the second partition 150 and the port 130 may be adjusted so that the oil is accommodated in the communication space 151 and the flow path 131 to prevent air from entering the oil space S through the port 130.

As described above, the reservoir tank 100 for a brake system according to one embodiment of the present disclosure may be provided with the second partition 150 so that oil can be accommodated in the communication space 151 in the second partition 150 and the flow path 131 in the port 130 to prevent air from entering the reservoir tank 100. The air can be prevented from entering the reservoir tank 100 and the oil space S to reduce noise generation and prevent degradation of pedal feeling and brake performance. In addition, a problem that an amount of oil between the float 161 and the oil detector 170 is reduced and a distance between the float 161 and the oil detector 170 is reduced to a predetermined distance or less even when an oil liquid level in the reservoir tank 100 is not lowered during acceleration, deceleration, or left-right rolling can be prevented.

In addition, the opening 152 may be provided in the wall surface 132 of the second partition 150 to facilitate a flow of oil, and the opening 152 may be formed in the wall surface 132 at the side opposite to the side at which the second partition 150 faces the oil injector 111, and thus, when the reservoir tank 100 is tilted forward and rearward, oil accommodated in the communication space 151 in the second partition 150 can always flow to pass through the opening 152 of the second partition 150 without interruption.

In addition, the second partition 150 is formed on the upper body 110 to be inclined at a predetermined angle with respect to the port 130, and thus, even when the reservoir tank 100 is tilted forward, oil can be accommodated in the communication space 151 and the flow path 131 to prevent air from entering the oil space S through the port 130.

A reservoir tank for a brake system according to one embodiment of the present disclosure can be provided with a second partition to prevent air from entering the reservoir tank through a port.

A reservoir tank for a brake system according to one embodiment of the present disclosure can prevent air from entering an oil space through a port to reduce noise generation.

A reservoir tank for a brake system according to one embodiment of the present disclosure can prevent air from entering an oil space through a port to prevent degradation of pedal feeling and brake performance.

In a reservoir tank for a brake system according to one embodiment of the present disclosure, a fluid in an oil space can flow smoothly through a second partition provided with an opening.

A brake apparatus according to one embodiment of the present disclosure can uniformly maintain an operating stroke of a piston using a stopper and a hooking jaw hooked on and supported by the stopper.

While the specific embodiments of the preset disclosure have been illustrated and described above, the present disclosure is not limited to the above-described embodiments and may be variously modified by those skilled in the art without departing from the gist of the technological sprit of the present disclosure defined by the appended claims.

What is claimed is:

1. A reservoir tank for a brake system, comprising:
an upper body provided with an oil injector through which oil is injected;
a lower body provided with a port through which oil is supplied to a master cylinder and coupled to the upper body to form an oil space; and
a partition provided in the oil space to prevent the oil from being gathered at one side,
wherein the partition includes a plurality of first partitions formed vertically, and a second partition provided in a space formed between opposing faces of at least two of the plurality of first partitions and provided with a communication space formed therein to communicate with the port, and
wherein the second partition has a hollow side wall surrounding an inner hole of the port and protruding from an inner bottom of the lower body and an opening, and an uppermost end of the hollow side wall of the second partition is spaced apart from an inner top of the upper body, wherein the hollow side wall is spaced apart from an inner side wall of the lower body which forms the outline of the oil space and is not connected to the inner side wall of the lower body except through a bottom surface of the oil space.

2. The reservoir tank of claim 1, wherein the opening is formed in a wall surface of the second partition.

3. The reservoir tank of claim 1, wherein the opening is formed to extend vertically.

4. The reservoir tank of claim 1, wherein the second partition is formed on the upper body to be inclined at a predetermined angle with respect to the port.

5. The reservoir tank of claim 1, wherein the partition is integrally formed with at least one of the upper body and the lower body.

6. The reservoir tank of claim 1, further comprising:
a float configured to vertically move along an oil level in the oil space to measure an amount of residual oil in the oil space; and
a float guide configured to guide the vertical movement of the float.

7. The reservoir tank of claim 6, further comprising an oil detector provided on a lower end portion of the float.

8. The reservoir tank of claim 1, wherein the second partition is provided in a hollow cylindrical shape.

9. The reservoir tank of claim 1, wherein the port is provided as a plurality of ports.

10. The reservoir tank of claim 1, wherein the upper body further includes a reservoir cap detachably provided on the oil injector.

11. The reservoir tank of claim 7, comprising:
a detection sensor configured to detect whether a distance between the float and the oil detector is a predetermined distance or less; and
a warning light turned on upon receiving a signal from the detection sensor.

12. The reservoir tank of claim 1, wherein the opening of the second partition is formed in the hollow side wall of the second partition at a side opposite to a side at which the second partition faces the oil injection portion.

13. The reservoir tank of claim 1, wherein the hollow side wall of the second partition is continuously formed from one end of the opening of the second partition to another end of the opening of the second partition.

14. A reservoir tank for a brake system, comprising:
an upper body provided with an oil injector through which oil is injected;
a lower body provided with a port through which oil is supplied to a master cylinder and coupled to the upper body to form an oil space; and
a partition provided in the oil space to prevent the oil from being gathered at one side,
wherein the partition includes a plurality of first partitions formed vertically, and a second partition provided in a space formed between opposing faces of at least two of the plurality of first partitions and provided with a communication space formed therein to communicate with the port, and
wherein the second partition has a hollow side wall surrounding an inner hole of the port and an opening located directly behind the inner hole of the port,
wherein the hollow side wall is spaced apart from an inner side wall of the lower body which forms the outline of the oil space and is not connected to the inner side wall of the lower body except through the bottom surface of the oil space.

15. The reservoir tank of claim 14, wherein the hollow side wall of the second partition is continuously formed from one end of the opening of the second partition to another end of the opening of the second partition.

* * * * *